Feb. 12, 1946.  S. J. SNOREK  2,394,723
BROACHING TOOL
Filed April 14, 1942
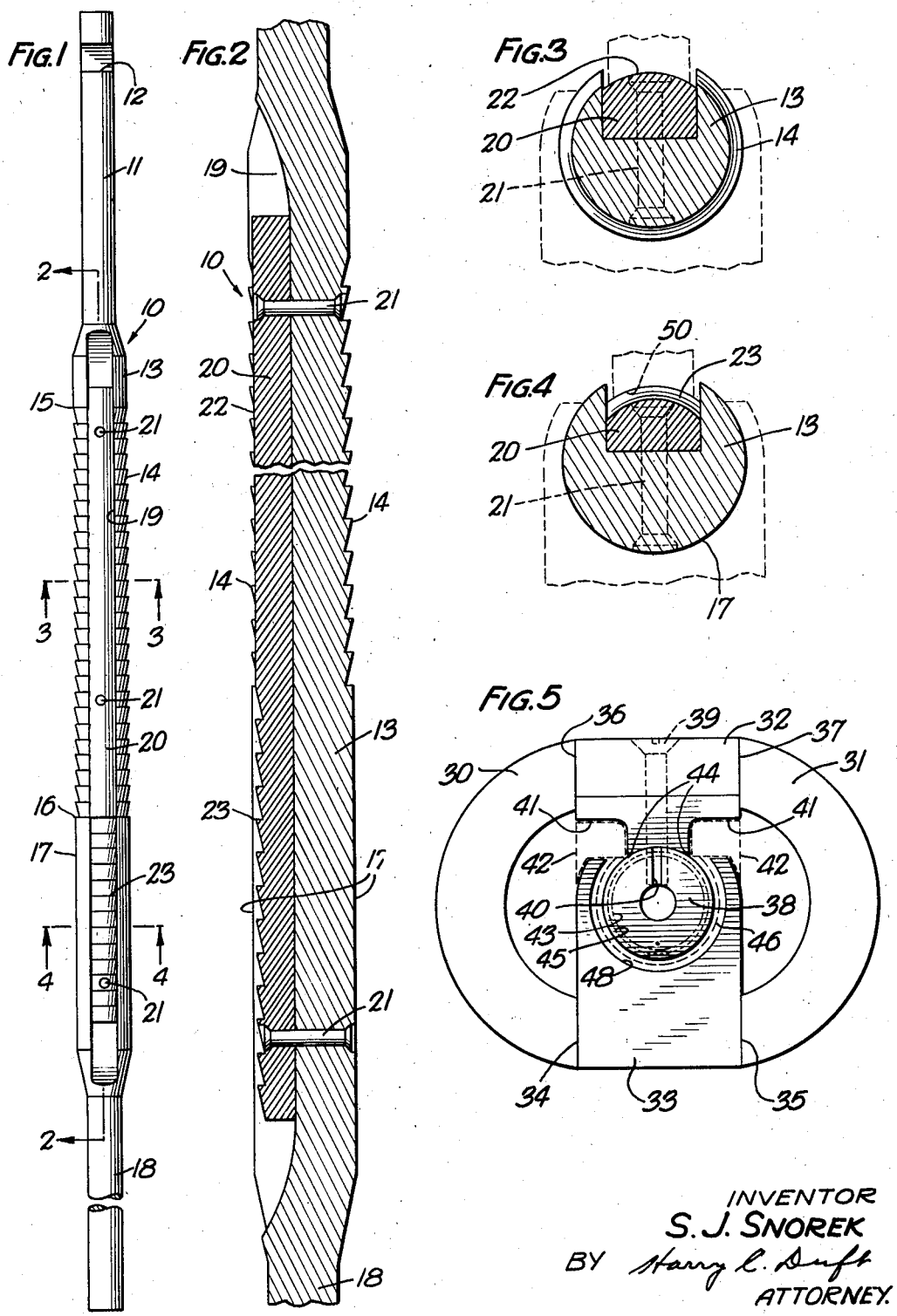
INVENTOR
S. J. SNOREK
BY Harry L. Duft
ATTORNEY.

Patented Feb. 12, 1946

2,394,723

UNITED STATES PATENT OFFICE 2,394,723

BROACHING TOOL

Stanley J. Snorek, Berwyn, Ill., assignor to Western Electric Company, Incorporated, New York, N. Y., a corporation of New York Application April 14, 1942, Serial No. 438,906

2 Claims. (Cl. 29—95.1)

This invention relates to a broaching tool for forming magnetic assemblies in electrical apparatus.

In the manufacture of some articles, for example, the magnet structure of electrical measuring instruments, a high degree of precision is required, and, accordingly, difficulties are encountered in forming cooperating surfaces of the magnet structure which define the air gap of the completed instrument. For example, in magnet structures where an annular core member is supported on the arcuate face of a pole shoe and is substantially surrounded by another pole piece with a C-shaped or open annular portion, it is particularly difficult to so form and assemble the various parts that the air gap between the open annular or C-shaped pole shoe and the core member may be held within a few thousandths of an inch of one another uniformly throughout the entire effective area of the pole piece having the open annular portion.

It is an object of the present invention to provide a broaching tool for forming articles with a high degree of precision.

In accordance with one embodiment of the invention, a bar of soft iron, which is to form the two pole pieces of the magnet structure, is milled to provide correspondingly shaped notches at opposed side faces thereof and after being so machined, the block of metal has a pair of C-shaped permanent magnets welded to it in the position which they are to occupy in the meter for which the magnet assembly is designed. After the assembly of the magnets and the bar are thus attached together, a hole is drilled at approximately the center of the bar, thus leaving very small sections of metal between the drilled hole and the slots formed on opposed surfaces of the bar. After the assembly is thus far machined, a round broach whose largest teeth are approximately ten thousandths of an inch larger than the drilled hole is drawn through the drilled hole to cut away the remaining thin portion of the metal between the slots and the drilled hole. This broaching operation is then followed by a broaching operation which leaves the relatively thin portion of the block, which is left, untouched by the teeth of the broach and a relatively larger hole is formed in the portion of the block which will ultimately form the open annular, C-shaped pole piece. The final step in forming the assembly comprises, in a single stroke of a broaching tool, cutting both of the pole pieces to their final contour and in order to do this, a novel type of broaching tool is utilized which comprises a guiding section of the same contour as the face of the pole piece which is to support the core on one side of the tool and teeth formed to cut the open annular or C-shaped pole piece to its final configuration on the other side thereof. The rear end of the special broaching tool is provided with a toothed portion diametrically opposed to a guiding portion, the toothed portion engaging and finishing the core supporting pole piece's core engaging face while a guiding surface bears on and is guided by the C-shaped or open annular pole piece. The tool for effecting this final broaching step comprises a relatively long rod of tool steel in which a slot has been milled for receiving a broaching insert. Broach teeth are cut on the outer surface of the rod of tool steel to cut the open annular or C-shaped pole piece and the insert is provided with teeth for making the final cut on the core engaging surface of the core supporting pole piece.

A better understanding of the invention may be had by reference to the following detailed description when considered in conjunction with the accompanying drawing, wherein Fig. 1 is an elevational view of a broaching tool for performing the final broaching step described hereinbefore;

Fig. 2 is a longitudinal sectional view taken along the line 2—2 of Fig. 1 in the direction of the arrows showing the broaching tool in cross section and on an enlarged scale, part of the tool being broken away to permit showing it on a sufficiently large scale to clearly illustrate the construction of the tool;

Fig. 3 is a transverse sectional view taken through the broaching tool along the line 3—3 of Fig. 1 in the direction of the arrows and showing, in dotted lines, the relative position of the pole pieces;

Fig. 4 is a view similar to Fig. 3, but taken along the line 4—4 of Fig. 1 and showing the rear portion of the broaching tool in section, and Fig. 5 is an elevational view of a magnet structure which may be formed in accordance with the present method.

Referring to the drawing, wherein like reference characters designate the same parts throughout the several views, particular reference being had to Figs. 1, 2, 3 and 4, the broaching tool designated generally by the numeral 10, comprises a shaft portion 11 having a notch 12 cut therein for attaching the broaching tool to any suitable broach operating mechanism. Intermediate its ends, the broaching tool 10 is enlarged to provide enlarged portion 13, which has, in the forward area of the tool (the upper portion as shown in Figs. 1 and 2), a series of teeth 14 cut in it. The teeth 14 extend substantially all the way around the cylindrical surface of the portion 13 and, as is usual in broaches, succeeding teeth are progressively larger so that each succeeding tooth on the broach will shave a very thin layer from the block of metal being cut. The teeth 14 extend from a point designated 15 to a point designated 16 and, from the point designated 16 to the rear end of the enlarged portion 13, there is provided guiding surface 17 of the same diameter as the final tooth of the teeth 14. The portion 13 of the tool has a shank 18 either formed integrally therewith or suitably attached thereto and of a reduced diameter extending from it to facilitate handling the tool. The portion 13 of the tool has a longitudinal slot 19 milled throughout its length in which a toothed bar 20 may be secured by rivets 21—21. The portion of the bar 20 extending between the points 15 and 16 is rounded, as shown at 22 (Fig. 3) to serve as a guiding surface and the portion of the tool extending from the point 16 toward the rear (the lower part Figs. 1 and 2) of the tool has teeth 23 cut in it. It should be noted that, as most clearly shown in Figs. 2, 3 and 4, the guide surface 22 and the cutting edges of the teeth 23 are positioned inwardly from the teeth 14 and the guiding surface 17, respectively.

The tool just described is utilized in the final step of the method of forming the magnet structure shown in Fig. 5. This magnet structure comprises, as finished, a pair of permanent magnets 30 and 31, C-shaped in configuration, and attached at their opposite ends, for example, by welding, to pole pieces 32 and 33, the attachment being made along the line of juncture between the pole pieces and the magnets 30 and 31, as shown at 34, 35, 36 and 37, respectively. The pole piece 32 in the final construction is adapted to have an annular core member 38 fixed to it by means of the screw 39 extending through the pole piece 32 and threadedly engaging threads cut in the side walls of a slot 40 formed in the annular core member 38.

The magnet structure thus briefly described is formed by preliminarily milling a slot 41 on each side of a block of soft iron, which, prior to the milling operation, was rectangular in shape. In performing this milling operation, the portions roughly indicated by the dotted lines 42—42 are cut from opposite sides of the block of soft iron. After this operation is performed, the C-shaped permanent magnets 30 and 31 are welded to the block with the notches cut in it and thereafter a hole, as indicated by the dotted line 43, is drilled in the block, thus leaving the upper end of the block attached to the lower end thereof only by the relatively small or thin sections designated 44. After the hole has been drilled through the block, a circular broach, which will ream or enlarge the hole 43, is drawn through the hole 43, thereby to cut away the thin sections at 44 and enlarge the hole 43, to approximately the size indicated by the dotted line 45. After the hole in the block has been enlarged to the approximate size, as shown by the dotted line 45, the block having been cut into two separate parts in this operation by cutting away the thin sections at 44, a broach tool, conforming in cross section substantially to circular configuration, but having one flat side in the area adjoining the upper pole piece, which has now been almost completely formed, will be drawn through the hole which has been enlarged to the size indicated by the dotted lines shown at 45, to enlarge it without, however, performing any cutting operation on the pole piece 32. This broach will cut the metal away to approximately the dotted line designated 46 and after this operation has been performed, the final cutting to size of the two pole pieces will be effected by the tool shown in Figs. 1, 2, 3 and 4 in one stroke of the broaching tool. As described hereinbefore, the broaching tool 10 is provided with teeth 14 gradually increasing in diameter from the point 15 to the point 16 (Fig. 1) and the surface at 22 is of such configuration as to engage the extending end of the pole piece 32 during the first portion of the stroke of the tool 10. As soon as the portion of the broaching tool 10 between the points 15 and 16 has been drawn through the magnet structure, the teeth 14 will have cut away the metal between the dotted line 46 and a surface 48, thus forming the face of the pole piece 33 to its ultimate configuration. Continued movement of the tool 10 will move the guiding surface 17 into engagement with the surface 48 of the pole piece 33 and guide the broaching tool 10 while the teeth 23 cut the surface 50 of the pole piece 32 to its final shape.

It will be understood that the lines designated by the numerals 41, 43, 45, 46 and 48 are only approximate indications of the location of these surfaces and that in actually performing these operations, the amount of metal removed in various strokes of the broaching tools are exceedingly small. As a matter of fact, in one magnet assembly made in accordance with this method, the drilled hole is .464" in diameter; the first round broach is .474" in diameter; the second broaching tool, that is, the one with the flat side on it, cuts slightly more than .010" from the pole piece 33; and the final broaching tool, that is, the tool 10, cuts approximately .010" from the surfaces 48 and 50. While these dimensions are given to illustrate the fineness with which these various surfaces must be cut, the dimensions themselves are not essential and other dimensions might be used depending upon the dimensions to which the structure is to be cut. Furthermore, the recitation of these dimensions, while not an essential part of the invention, will illustrate the nicety with which these surfaces must be formed in order to provide a meter magnet structure which will operate with the desired accuracy when assembled in a meter.

What is claimed is:

1. A broaching tool comprising a forward portion having teeth thereon extending throughout the greater part of a circle, an arcuately shaped guide portion having the same axis as the teeth for guiding the teeth, a rear portion having arcuately shaped teeth thereon coaxial with the teeth on the forward portion, and a guide portion conforming to the largest teeth on the forward portion.

2. A broaching tool comprising coaxial rear and forward cutting teeth for cutting different surfaces on a single stroke of the tool and guiding portions diametrically opposed to said cutting teeth, one guiding portion being positioned to bear against the surface to be cut by the teeth at the opposite end of the tool, and the other guiding portion being positioned to bear against the surface which has been cut by the teeth at the opposite end of the tool.

STANLEY J. SNOREK.